E. C. FAUST.
FEEDING AND WATERING TROUGH.
APPLICATION FILED MAY 24, 1922.
1,438,028.
Patented Dec. 5, 1922.
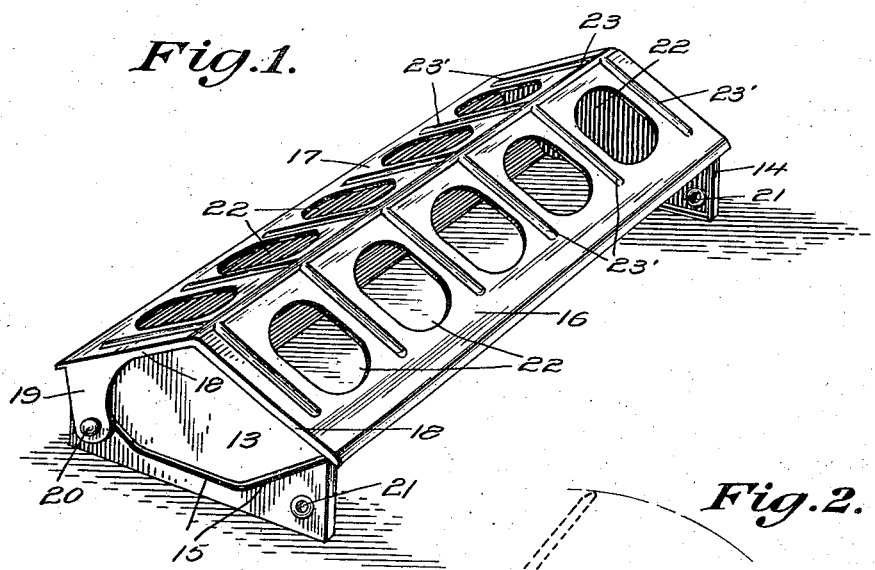
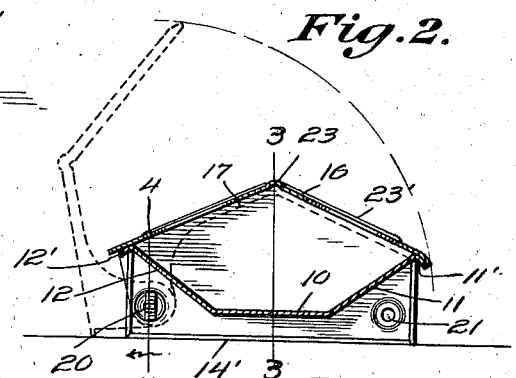
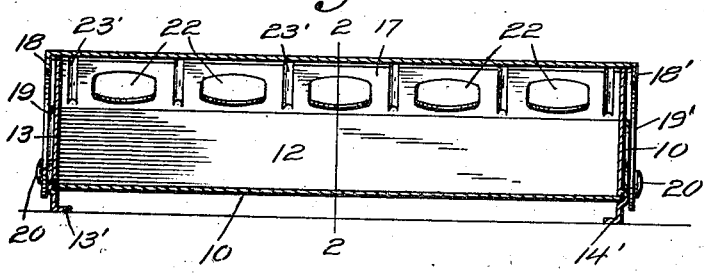
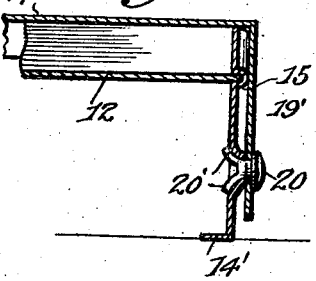
Elroy C. Faust, INVENTOR.
BY
Geo. Kimmel
ATTORNEY.

Patented Dec. 5, 1922.

1,438,028

UNITED STATES PATENT OFFICE.

ELROY CHARLES FAUST, OF URBANA, INDIANA, ASSIGNOR TO THE CYCLONE MANUFACTURING COMPANY, OF URBANA, INDIANA.

FEEDING AND WATERING TROUGH.

Application filed May 24, 1922. Serial No. 563,321.

*To all whom it may concern:*

Be it known that I, ELROY CHARLES FAUST, a citizen of the United States, residing at Urbana, in the county of Wabash and State of Indiana, have invented certain new and useful Improvements in Feeding and Watering Troughs, of which the following is a specification.

This invention appertains to certain improvements in poultry feeding and watering troughs generally, and more particularly to a type of the same adapted for use in feeding and watering young chicks and the like.

The principal object of the invention is to provide for a device of the class mentioned, and one of a simple, inexpensive and durable construction and arrangement, and of a nature to be sanitary in use, and capable of being readily and easily filled and cleaned.

Another object of the invention is to provide for a feed and watering trough as hereinbefore characterized, and one of a sheet metal construction, wherein the parts may be readily stamped or pressed into proper shape by the use of dies, with certain of the parts made strong and substantial by forming therein strengthening or reinforcing beads or ribs, the metal preferably being galvanized to prevent the rusting thereof when exposed to the weather.

With the foregoing and other objects in view, the invention resides in the certain new and useful construction and arrangement as will be hereinafter more fully described, set forth in the appended claims, and illustrated in the accompanying drawing, in which:—

Figure 1 is a perspective view of a preferred embodiment of the device,

Fig. 2 is a vertical transverse section taken on the line 2—2 of Fig. 3,

Fig. 3 is a vertical longitudinal section taken on the line 3—3 of Fig. 2,

Fig. 4 is an enlarged fragmentary section taken on the line 4—4 of Fig. 2, and,

Fig. 5 is a perspective view of one of the devices for hinging or pivoting the cover in position on the trough body.

Referring to the drawing, this feeding and watering device comprises a body of trough form consisting of a horizontally disposed flat bottom wall 10, and front and rear side walls 11 and 12 inclining outwardly from the opposite longitudinal edges of the bottom wall 10. The opposite ends of this trough body are closed by vertically disposed end walls 13 and 14, and are attached thereto by having the end edges of the bottom, front and rear walls 10, 11 and 12 engaged in complementally arranged grooves formed by the stamping of the end walls 13 and 14 in a manner to form outstanding beads 15, which have their opposite side walls pressed tightly into engagement with the end edges of the body 10, after the same have been fitted into the grooves thereof. The bottom edges of the end walls 13 and 14 are preferably inturned at right angles to provide substantial supporting flanges or feet 13′ and 14′, respectively.

Arranged to enclose the entire open top of the trough body 10 is a cover of angular form to provide oppositely inclined front and rear portions 16 and 17. The opposite ends of the cover are supported directly on the upper similarly inclined edges of the end walls 13 and 14, while the opposite longitudinal edges thereof rest on angularly outturned flanges 11′ and 12′ of the front and rearwardly inclined walls 11 and 12 of the trough body. The opposite end edges of the cover are preferably bent to provide depending flange portions 18, 18′, disposed outwardly of the end walls 13 and 14, and these flanges at the opposite ends of the inclined portion 17 of the cover are extended in a downward direction to provide apertured ears 19, 19′, respectively, by means of which the cover is to be pivotally secured in position on the trough body, suitable pivot studs or pins 20 being passed inwardly of the apertures of these ears and through openings 21 formed in the end walls 13 and 14. These studs or pivots 20 are preferably in the form of headed members having the ends of their shank portions bifurcated as at 20′, whereby to be secured in proper position by the spreading apart of the oppositely bifurcated portions, substantially as shown.

The oppositely inclined walls 16 and 17 of the cover are provided with a plurality of equidistantly spaced openings 22, whereby small chicks may have ready access to food or water placed within the trough body, and the cover is strengthened at its peak by a longitudinally extending bead or rib 23, and also by a series of transversely extending beads or ribs 23′ to either side of the bead or rib 23, the beads or ribs 23' being disposed medially between the openings 22 and between the outer of the latter and the opposite end edges of the cover. As shown, the openings 21 are arranged in alined pairs inwardly of the opposite side edges of the end walls 13 and 14, so that the cover may be pivoted for opening movement to either side of the trough. It is to be noted of the feeding openings 22 that the edges of the same may be slightly inturned or inwardly flanged whereby to prevent sharp edges of the metal from cutting or otherwise injuring the chicks during their feeding.

From the foregoing, it will be obvious that the invention provides for a practical device for the reception of dry mash, hard grain or grit, sour milk or water; that ready access is had to the food or drink within the trough body through the feed openings in the trough cover, without any spilling of the contents, such as usually results in the use of ordinary open top troughs; that, by providing a cover of the type shown, the food or drink is retained comparatively freer from contamination than would otherwise be the case were the same not used at all; that, by hinging the cover in the manner indicated for the same, the trough may be thoroughly and easily cleansed and filled after it has been swung to open position; and that the pressed and stamped metal parts, preferably made from a galvanized sheet metal, are made more durable and lasting by the provision of the strengthening beads or ribs, particularly on the cover portion thereof.

It is well understood that, while a preferred embodiment of the device has been described and illustrated herein in specific terms and details of construction and arrangement, various changes in and modifications of the same may be resorted to without departing from the spirit of the invention, or the scope of the claims appended hereto.

Having thus fully described the invention, what is claimed is:—

1. In a device of the class described, a trough body of sheet metal formed to provide a flat bottom wall and opposite inclined side walls, vertical end walls having complementally formed grooves therein for the reception of the opposite end edges of said trough body, a cover hingedly secured at one side of said trough body and formed to provide oppositely inclined wall portions each having a plurality of equidistantly spaced openings therein to give ready access to the interior of said trough body from the opposite sides thereof, and strengthening ribs formed on the longitudinal center of said cover and transversely of the inclined walls thereof medially between the said openings.

2. In a device for the purpose set forth, a pair of end walls, a trough body having its ends extending into the inner face of and overlapping the top of said end walls, and a a cover removably mounted over said trough and seated on the portions of the trough overlapping said end walls.

3. In a device for the purpose set forth, a pair of end walls having oppositely disposed inwardly extending flanges, a trough body having its ends extending into the inner face of said end walls and overlapping the tops of said flanges, and a cover removably mounted over said body and seated on the portions of the body overlapping said flanges.

4. In a device for the purpose set forth, a pair of end walls formed with oppositely disposed inwardly extending flanges, a trough body arranged between said walls and overlapping the tops of said flanges, and a cover hinged to said end walls and seated on the portion of the trough body which overlaps said flanges.

5. In a device for the purpose set forth, a pair of end walls having oppositely disposed inwardly extending flanges, a trough body arranged between said walls and having oppositely disposed inclined side walls overlapping the tops of said flanges, and a cover hinged to said end walls and angle shaped in cross section, said cover having each of its sides provided with a row of spaced openings, said cover formed with a longitudinally extending reinforcing rib and further provided with oppositely disposed reinforcing ribs projecting from said longitudinal rib.

In testimony whereof, I affix my signature hereto.

ELROY CHARLES FAUST.